June 4, 1968   B. R. DANTI   3,386,361
PHOTOGRAPHIC PRODUCT
Filed Dec. 27, 1965   3 Sheets-Sheet 1

INVENTOR.
Bernard R. Danti
BY
Brown and Mikulka
ATTORNEYS

June 4, 1968   B. R. DANTI   3,386,361
PHOTOGRAPHIC PRODUCT

Filed Dec. 27, 1965   3 Sheets-Sheet 2

INVENTOR.
Bernard R. Danti
BY
Brown and Mikulka
ATTORNEYS

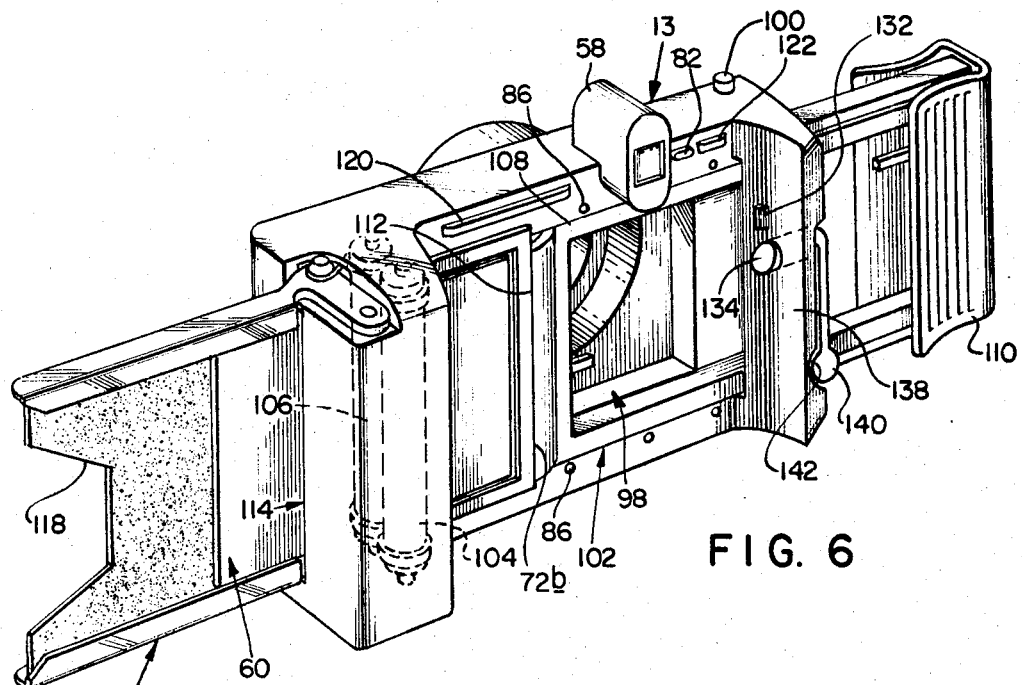

United States Patent Office 3,386,361
Patented June 4, 1968

3,386,361
PHOTOGRAPHIC PRODUCT
Bernard R. Danti, Lexington, Mass., assignor to Polaroid Corporation, Cambridge, Mass., a corporation of Delaware
Filed Dec. 27, 1965, Ser. No. 516,363
16 Claims. (Cl. 95—13)

ABSTRACT OF THE DISCLOSURE

The present application relates to an assemblage consisting of a container or magazine mounting a film-pack. The magazine includes structure cooperating with that of the film-pack to enable loading of the film pack and forward movement, and release of each unit thereof when the magazine is mounted in a camera.

---

This invention relates to a photographic product or assemblage which includes a film magazine adapted to be mounted on and form an integral housing portion of a miniature camera and a film-pack contained therein, the magazine including novel structural features relating to the loading and movement of the film pack.

It is contemplated that the assemblage of magazine and film-pack of the present invention will be commercially available as a unit, the film-pack containing some six or more film assemblies, ten such assemblies being a preferred number. It is further contemplated that, after photographic exposure and processing of all of the film assemblies of the film-pack, the exhausted magazine will be discarded, in which case it is preferably, although not invariably, to be considered as of a disposable type.

The subject assemblage of magazine and film-pack is especially intended for use with a so-called miniature or 35 mm. camera of a type adapted to perform both the photographic exposure and rapid processing of each film assembly. Such a camera is described in copending U.S. patent applications, Ser. Nos. 516,415, 516,494 and 516,-416, filed December 27, 1965. Processing involves a diffusion transfer method of image formation wherein finished photographic transparencies in either black-and-white or full color are produced, with particular emphasis on the latter.

A film assembly of a type suitable for use with the magazine of the present invention includes a releasably-carried processing liquid. It is of a multilayer structure such that, after exposure, release of the liquid by the application of a compressive force to a liquid-containing component thereof and imbibition of the liquid into predetermined layers, including an exposed silver halide emulsion layer, provide an image. The image is formed by the transfer of image-forming substances to a designated image-receiving surface. Processing is initiated by moving the film assembly between compressive means and involves mechanical transport means operating according to a predetermined program. A processing liquid suitable for use in forming the image may comprise an aqueous solution of a silver halide developer such as hydroquinone, a silver halide solvent of the type of sodium thiosulfate, and an alkaline substance such as sodium hydroxide. It may also preferably include a thickening or film-forming agent such as a synthetic polymer of the type of sodium carboxymethyl cellulose and, possibly, a high-molecular-weight polymeric mordant to facilitate the transfer process.

In producing a black-and-white image, a latent image is developed; the exposed silver halide is reduced to silver, and the unreduced silver halide forms a soluble silver complex which is transferred from undeveloped areas to the image-receiving surface, the image being formed on the latter in silver. In the production of a color transparency, substances capable of forming dye images at the image-receiving surface such as dyes, color couplers, or the like, may be employed in the transfer process. Or, in a preferred method, a black-and-white image, in conjunction with a color screen, may be employed to provide an image visible in a gamut of colors. Methods and film materials for producing black-and-white or multicolored images, of categories broadly related to those contemplated herein, are described in U.S. Patents Nos. 2,543,181, 2,614,926, 2,707,150, 2,726,154, 2,944,894, 2,968,554, 2,983,606 and 3,087,815 and in the copending U.S. patent application Ser. No. 516,494, filed Dec. 27, 1965.

An object of the present invention is to provide a photographic assemblage composed of a film container or magazine, with a film-pack mounted and sealed therein, which is suitable for use with a novel type of miniature camera, the magazine constituting an integral portion of the camera outer housing.

Other objects are to provide a film magazine of the aforementioned category which, after exhaustion of the contained film-pack, is feasibly disposable from an economic viewpoint; to provide a film magazine, as stated, which is adapted to be mounted within a recessed area of a camera and, when thus mounted, constitutes an integral portion of the camera housing, filling the recess and complementing other portions thereof to produce a continuous unbroken outer housing surface; to provide a magazine of the character described for holding a plurality of film units without constriction and embodying novel means for biasing the film units forwardly toward a focal plane; to provide a biasing means, as described, which is responsive to actuating means embodied in the camera; to provide a magazine of the type stated including positioning and releasable detent means cooperating with positioning, detent-release means of the camera; to provide a magazine of the character described which incorporates an outer wall or housing section and a removable interlocking inner wall or housing section, the former largely serving as a sturdy supporting and partially enclosing element supplementing housing portions of the camera, as above stated, and including retaining or hold-back means for insuring the individual removal of units of the film pack, and the latter including enclosing, biasing, guiding and retentive means relative to the film-pack as well as the aforesaid detent means; and to provide a two-piece magazine of the category described which permits the ready loading of a film-pack and which is adapted to a relatively inexpensive injection molding method of manufacture.

Other objects of the invention will in part be obvious and will in part appear hereinafter.

The invention accordingly comprises the produce possessing the features, properties and the relation of components which are exemplified in the following detailed disclosure, and the scope of the application of which will be indicated in the claims.

For a fuller understanding of the nature and objects of the invention, reference should be had to the following detailed description taken in conection with the accompanying drawings wherein:

FIG. 6 is a diagrammatic, perspective, rear view of a camera adapted to mounting of the magazine thereon and including parts cooperating with the magazine and film pack;

FIG. 7 is a view, similar to that of FIG. 6, illustrating the camera and magazine in assembled relation; and FIG. 8 is a fragmentary diagrammatic view of mechanism for releasing the magazine from the camera.

Figure 1:
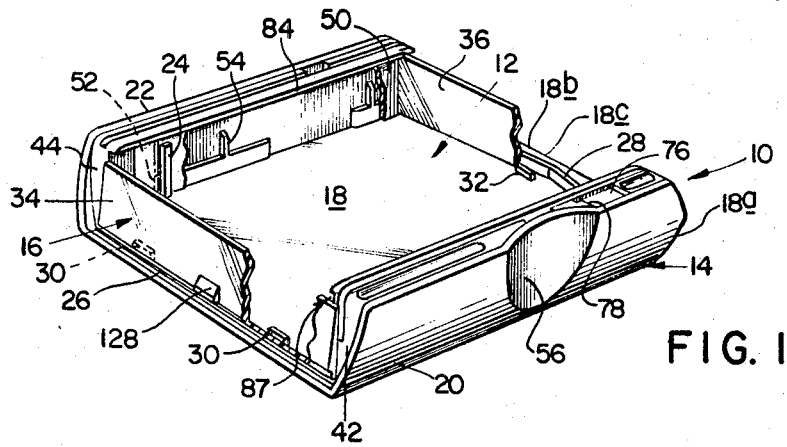
FIGURE 1 is a diagrammatic, perspective, front view of the magazine, with parts broken away.
Figure 4:
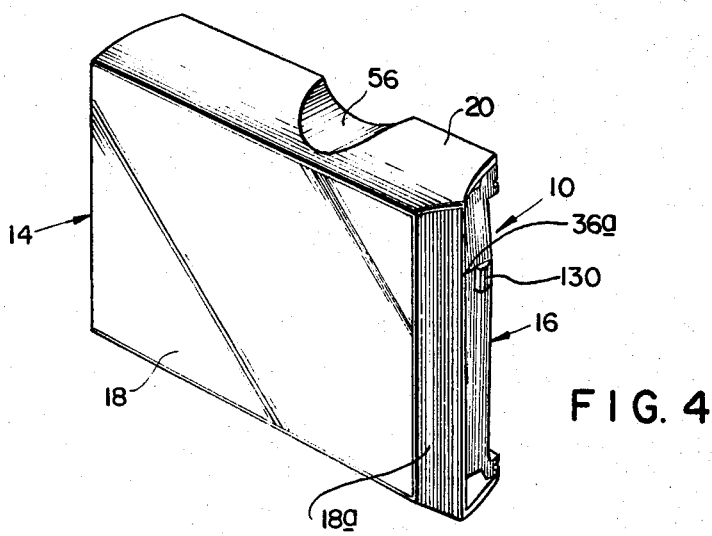
FIG. 4 is a diagrammatic, perspective, rear view of the magazine.

Referring now to FIGURE 1, wherein is shown a front view of the magazine 10, it will be noted that the magazine has an open front or face 12 which is to be positioned facing the exposure aperture of a camera 13 (FIGS. 6 and 7) upon which the magazine is to form a part. The magazine, preferably formed by an injection molding method of a suitable opaque, substantially-rigid plastic material such as a polystyrene, comprises the outer housing section 14 and the interlocking inner housing section 16. The outer housing section is composed, essentially, of a flat rear-wall member 18 and two slightly curved side-wall members 20 and 22, namely, what may be regarded as top and bottom members when positioned as shown in FIGS. 4 and 7, two ends of the structure being substantially open. Each side-wall member includes an inwardly spaced post 24 extending forwardly from the rear wall 18. The rear wall 18 includes the flange members 26 and 28 projecting forwardly therefrom adjacent to the open sides of the outer housing section. A pair of short flanges or studs 30 extends forwardly from the rear-wall member 18, in slightly-spaced relation to the flange 26. A single short flange or stud 32 projects forwardly from the rear-wall member 18 in slightly-spaced relation to the flange 28.

The rear extremities of the end-wall members 34 and 36 of the inner housing section 16 are positioned between the respective flanges and studs when the inner section is mounted within the outer section to provide a tight fit of the two sections and an essentially-unitary assemblage. Additionally, a light seal is provided by each of these mating end-wall and flange portions. The flange members 38 and 40 of the inner section, cooperating with the flange members 42 and 44 of the outer section, also contribute to hold the inner section firmly seated. Further means contributing to the interlocking and firm nesting of the two housing sections include a pair of slots 46 formed within and extending rearwardly to the rearmost edge of the side walls 48 and 50 of the inner section which engage the lateral supports 52 for the posts 24, and the slightly curved ribs 54 of the outer section which bear against the outer surfaces of side-walls 48 and 50. The end-walls 34 and 36 possess a given resiliency and side-wall 36 is slightly bowed at 36a for a purpose to be described below.

The terms "front" and "rear" or "forwardly" and "rearwardly," as used herein, refer to a location or direction relative to the front of a camera, assuming the magazine or magazine and film pack to be mounted thereon. The terms "top" and "bottom" relate to portions of the magazine or camera as positioned in FIGS. 4, 6 and 7.

The rear wall 18 of the outer housing 14 includes a forwardly-angled portion 18a which provides both a symmetrical conformation thereof with the outline or configuration of the camera housing and spacing at 18b between its edge 18c and the end-wall 36 of the inner housing. This spacing is utilized by means to be described for bearing against and flexing the wall 36. The depression 56 formed in the wall 20 serves the purpose of making it possible to mount a finder 58 nearer to the optical axis of the camera than would otherwise be possible, as shown in FIGS. 6 and 7. The depression 56 is not essential to the function of magazine or film-pack, however, and its inclusion is optional.

The generally rectangular inner section of housing 16 is that which principally mounts the film assemblies 60 of the film pack 61 in a releasably-held condition. In addition to portions thereof previously described, it includes a U-shaped or yoke-like biasing element 62, adapted to urge the film assemblies of the film-pack forwardly in the magazine. The element 62 is preferably composed of a metal, such as steel or aluminum, and includes the perforated side or end members 64 and 66 interconnected by the generally flat central member 68. The central member 68 includes a pair of laterally-extending film-assembly contacting elements 68a adjacent to the side-walls 48 and 50. The elements 68a are located approximately intermediately of the end-walls 34 and 36 and are adapted to bear against the supporting mount or framing component 72 of each film assembly.

The somewhat resilient end members 64 and 66 include tapered perforations 70 which are pivotally mounted on a pair of bearing means 74 in the form of studs or prongs which project outwardly from the side walls 48 and 50, respectively, one being located at, and integral with, each of the side-walls. A turned-over integral extension 76 of the end-member 64 constitutes a lever which is freely movable in the aperture 78 formed between the outer section 14 and inner section 16. By applying pressure to lever 76 the U-shaped element 62 is caused to rotate in a clockwise direction, as viewed in the drawing, about the bearing studs 74, thus moving the contacting elements 68a arcuately in a generally forward direction and biasing the film pack forwardly in the magazine, as above stated. Rotation of the element 62 is permitted by the curved slots 80 formed in the side-walls 48 and 50 which allow movement of the member 68 therewithin, the curve being defined by radii emanating from the pivot point of mounting studs 74.

Figure 3:
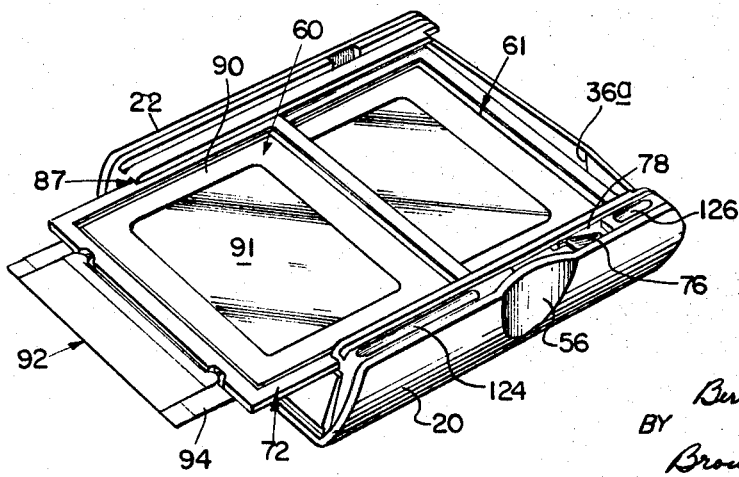
FIG. 3 is a similar view of the magazine and film-pack assemblage illustrating removal of the film assemblies.

The above-described actuation of the lever 76 is accomplished through contact therewith by the rearwardly-extending, spring-biased pin 82 (FIG. 6) of the camera when the magazine is mounted on the camera, as shown in FIG. 7. Assuming the magazine to contain the film pack 61, as shown in FIG. 3, the film assemblies 60 are releasably held therein prior to insertion of the unit in the camera through contact of the inwardly overturned flanges 84 of the inner section 16 with mount portions 72 of the foremost film assembly. However, when the magazine is mounted on the camera, the film-pack is slightly retracted in the magazine because the mount portions 72 are brought into slidable engagement with a plurality of rearwardly-projecting protuberances or spacers 86 of the camera. These spacers establish the foremost film assembly precisely at the focal plane of the camera and allow unrestricted slidable movement thereof laterally out of the magazine after its photographic exposure for processing purposes. It will be noted that the front edges of the side-walls of the inner section are coplanar with the front edges of the side-walls 20 and 22 of the outer section and that the height of the end-walls 34 and 36 of the inner section is less than that of the side-walls 48 and 50. An aperture or spacing is thus provided at 87 permitting the aforesaid lateral movement of the film assembly.

Figure 2:
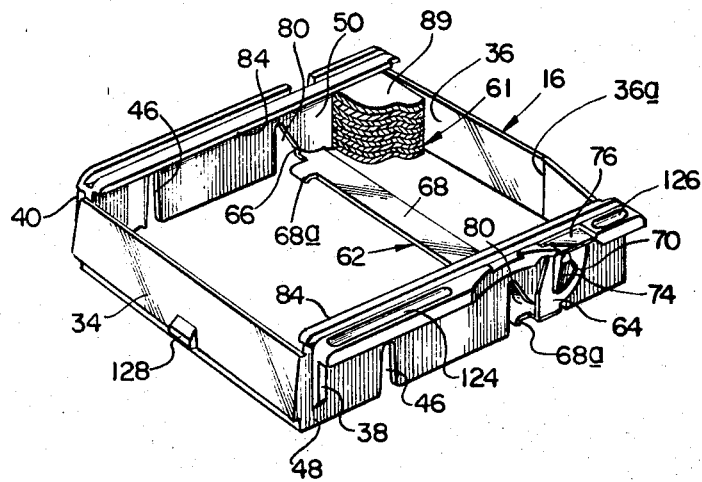
FIG. 2 is a similar view of the removable inner section of the magazine, separated from the outer section.

A succeeding film assembly of the film-pack, underlying the foremost film assembly, is held against inadvertent lateral movement simultaneously with that of the latter such as might be influenced through frictional contact of the two, by contact of leading edge portions 72a of the film assembly mount with the posts 24 of the outer section. An opaque protective cover-sheet 89, of rectangular shape composed of a cardboard or the like, and of dimensions substantially similar to those of the open face 12 of the magazine, is positioned in front of the first film assembly of each film-pack prior to the initial exposure. This sheet must be slidably removed in the manner of each film assembly before performing the exposure. A fragment of sheet 89 is shown in FIG. 2. It is to be understood that a removable protective covering (not shown), such as an opaque metallic foil, may be employed to enclose the magazine and contained film-pack, as sold, to provide a hermetic seal, the covering extending across at least the open face and end-walls 34 and 36 of the inner section to the outer surface of rear wall 18. Such a covering is to be removed prior to or during mounting of the magazine on the camera. Alternatively, the entire unit of magazine and film-pack is supplied in a separate box which, preferably, is hermetically sealed. In FIG. 3, a film assembly is shown as it would appear undergoing slidable removal from the film-pack 61 and magazine. It will be noted that the lever 76 has been partially depressed. This indicates a stage at which some of the film assemblies of the film-pack have already been exposed and removed from the magazine.

Figure 5:
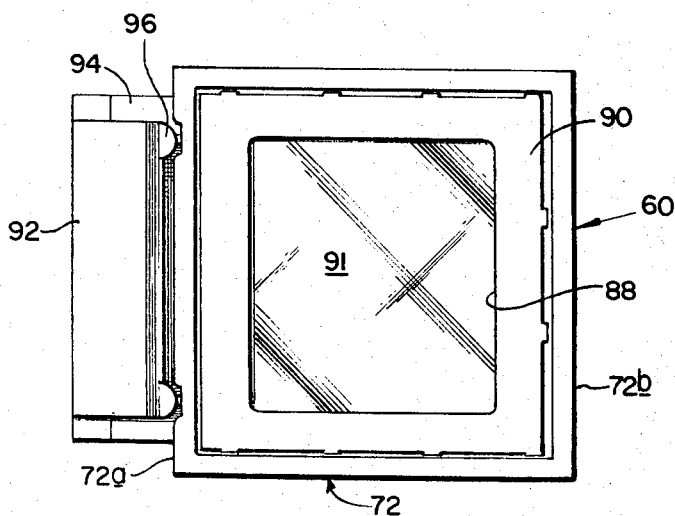
FIG. 5 is a diagrammatic, front view of a film assembly of a type included in the film-pack of the assemblage.

In FIGS. 3 and 5 the front side of the film assembly 60 is illustrated. Each film assembly, in addition to the substantially rigid mount 72, includes a mask 90 which outlines the opening 88 comprising the picture area. Within the latter, for example, is mounted a composite film structure 91 comprising a photosensitive element of the assembly, a color providing layer, and various elements or layers facilitating the spreading and imbibition of a processing liquid relative to the photosensitive emulsion after its exposure. Among these underlying or rearwardly-located layers is an opaque element or layer, to the rear of the emulsion, which, during exposure of a foremost film assembly, prevents the unwanted exposure of the film assembly behind it. A so-called wedging tab 92 extends laterally from the mount 72. A sac-like container 94 releasably holding the processing liquid is mounted at the rear or far surface of the tab 92, the lateral margins, only, of the container being visible in FIGS. 3 and 5. The tab 92 is frangibly connected by links 96 to the mount 72. When processing of the film assembly has been completed, the tab and certain of the layers used in processing are manually stripped away, leaving the mounted transparency, in a completed state, ready for direct viewing or projection.

When the magazine 10, containing the film-pack 61, is mounted on the camera 13 and the opaque cover sheet has been removed, the foremost film assembly thereof is positioned at the focal plane of the camera facing the exposure aperture 98 and in readiness for photographic exposure and processing. After completing the exposure step, as by pressing the shutter release 100, processing apparatus comprising a film assembly transport mechanism 102 and a pair of pressure rolls 104 and 106 are operated to process the exposed emulsion and provide a finished transparency.

In brief, the transport mechanism includes a rectangular frame-like element 108 slidably mounted in the camera, one end of which projects through the camera housing and has an actuating handle 110 attached thereto. The other end of the element 108 terminates in a contacting or "pusher" member 112 which, when the handle is drawn outwardly to its maximum distance, engages the trailing edge 72b of the film assembly mount 72, assuming the film assembly to be located at the focal plane. The handle 110 is then pushed inwardly to its full extent, thus advancing the film assembly between the pressure rolls, the latter fracturing the container 94 to release the processing liquid and spread it between the emulsion and an adjacent layer of the film assembly. The film assembly is thus advanced until it passes through an aperture 114 formed in the camera housing and lies substantially within a semienclosed chamber 116. After a brief pause of a few seconds to complete imbibition of the processing liquid into a layer or layers of the film assembly, the tab 92 and layers superimposed therewith are grasped at the cutout area 118 of the chamber and completely removed, the tab 92, exhausted liquid container 94 and layers of the assembly utilized in the processing operation being manually separated from remaining layers and discarded, leaving the finished print in the form of a mounted transparency.

Means for firmly positioning and locking the magazine 10 on the camera 13 and for effecting release of the locking means are illustrated in FIGS. 4, 6 and 8. Correct positioning of the magazine is insured by the keying flanges 120 and 122 which are adapted to enter the recesses 124 and 126 of the magazine. The projecting latching members 128 and 130 of the magazine are adapted to engage a pair of mating latching members of the camera, one of the latter 132, only, being shown. The beveled or acutely angled surfaces of the respective latching members of magazine and camera are automatically brought into slidable contact with one another when the magazine is correctly inserted, in the concavity of the camera, as determined by matching the adjoining surfaces of camera and magazine and utilizing the aforesaid keying means. The latches then snap into locked relation of their surfaces which are disposed substantially at 90° to end-wall members of the magazine and camera surfaces, respectively, as permitted by the resiliency of end-walls 34 and 36 of the magazine and the bowed structure of end-wall 36.

Once locked in position, the magazine can only be removed by actuation of its release mechanism. The latter includes the cam 134 mounted on the extremity of the rotatable shaft 136 so as to be positioned within the spacing 18b (FIGURE 1) provided between the end-wall 36 of the inner magazine section 16 and the adjoining wall portion 138 of the camera. An aperture 139 is provided in which the shaft 136 is pivotally mounted. An actuating lever 140 is mounted at the opposite end of the shafe, access thereto being provided by the slot 142. When the magazine is mounted on the camera the working surface of the cam is very slightly spaced from the angled facing surface of the resilient bowed end-wall 36. By manually raising the lever 140 as, for example, by thus rotating it 90°, the cam surface is caused to bear against the end-wall 36, bend it inwardly, and thus remove the latching member 130 from engagement with the latching member 132. A slidable type of latch-release mechanism exerting a wedging force between the magazine end-wall 36 and the camera surface 138 and movable along a slot could, alternatively, be employed although the lever-and-cam device shown is a preferred means for the purpose.

The unique two-piece structure of the magazine makes it possible to easily load the film pack therein. It also constributes to a straight-forward injection molding method of manufacture which permits formation of the overturned flanges 84 without necessitating lateral movement of molding apparatus. Both the molding method of manufacture and the largely plastic composition of the magazine contribute to its relative inexpensiveness and the feasibility of discarding it when exhausted of its film-pack content.

Loading of all magazines, for example in an environment devoid of actinic light at the point of manufacture, is accomplished as follows: It is to be assumed that the inner housing section 16 has not as yet been inserted in the outer housing section 14 and that the biasing element 62 has not been mounted on the inner section. The film-pack is inserted in inner section 16 from the front, that is, through the opening at the bottom as viewed in FIG. 2. The foremost opaque protective cover sheet 89 of the film pack is slidably held by the flanges 84. The biasing element 62 is then mounted, the end members 64 thereof being sprung over the mounting studs 74. At this stage, element 62 contributes to hold the film-pack in place. The loaded inner section 16 is then inserted in the outer housing section 14. Assuming the magazine to be of a disposable type, the inner and outer sections are preferably bonded together at selected contacting areas, as by an ultrasonic method, to form a unitary structure. Alternatively, latching means incorporated with the two sections may be employed to hold them in assembled relation. A protective foil or boxing element may be provided, to seal portions of the magazine as hereinbefore stated, or to enclose the entire magazine and film pack.

Since certain changes may be made in the foregoing product without departing from the scope of the invention herein involved, it is intended that all matter contained in the above description or shown in the accompanying drawings shall be interpreted as illustrative and not in a limiting sense.

What is claimed is:

1. A photographic assemblage of a film-container and film-pack for use in conjunction with a camera wherein each film assembly of the film-pack is moved forwardly to an exposure position in the container and, thereafter, laterally out of the container to adjacent processing means of the camera, said assemblage comprising a generally rectangular outer container section adapted to complement the housing of said camera and including, respectively, a rear-wall member, two opposed side-wall members, two substantially open opposed ends and a plurality of flange means extending forwardly from said rear wall member so as to be disposed at least in part across said open ends, a substantially rectangular inner container section slidably insertable into a substantially open frontal face of said outer section and including, respectively, two opposed side-wall members, two opposed end-wall members interconnecting said side-wall members, a forwardly and rearwardly movable film-assembly positioning means for urging the forward movement of said film-pack, means for actuating said positioning means, means for limiting said forward movement of said film-pack, and aperture means permitting the lateral movement of each film-assembly of said film-pack from said container when it is positioned at said exposure position therewithin, complementary holding means of said outer and inner sections for retaining said inner section mounted in said outer section, a film-pack so unconstrictedly contained in said inner section as to be readily adapted to forward and rearward movement therewithin, and means for releasably holding said assemblage correctly mounted in locked position on said camera.

2. A photographic assemblage, as defined in claim 1, wherein said flange means are adapted to receive wall portions of said inner container section therebetween for both frictionally holding said wall portions and providing a light seal.

3. A photographic assemblage, as defined in claim 1, wherein said film-assembly positioning means is a U-shaped yoke-like element so pivotally mounted on said inner container section as to bear against the generally central rear areas of said film-pack when actuated, and wherein said actuating means is a lever integral with said positioning means adapted to be contacted by a projecting element of said camera when said container is mounted thereon.

4. A photographic film assembly, as defined in claim 1, wherein said means for limiting forward movement of the film-pack is in the form of flange means extending inwardly from the forward extremities of said side-wall members of said inner section.

5. A photographic assemblage, as defined in claim 1, wherein said means for holding said assemblage correctly mounted on said camera includes recess means adapted to accept projecting means of said camera, said means constituting also a keying device.

6. A photographic assemblage, as defined in claim 1, wherein said means for holding said assemblage correctly mounted on said camera includes latching means mounted on each of said end-wall members adapted to releasably engage latching means of said camera.

7. A photographic assemblage, as defined in claim 6, wherein at least one of said end-wall members is resilient and adapted to flexing whereby the latching means thereof may be released from a complementary latching means of said camera by flexing said end-wall member.

8. A photographic assemblage, as defined in claim 7 wherein said resilient end-wall member is bowed to facilitate its undergoing flexing.

9. A photographic assemblage, as defined in claim 6, wherein said latching means is in the form of a pair of projecting members, each having a locking surface extending substantially at 90° to the surface of an end-wall member and a slidably engaging surface disposed at an acute angle relative to said surface.

10. A photographic film assemblage, as defined in claim 4, wherein said end-wall members of said inner section are of a lesser height than that of said side wall members thereof from which said flanges extend whereby providing at least an aperture between the forward edges of said end-wall members and said flanges permitting a lateral removal of a foremost film assembly of said film pack from said container.

11. A photographic assemblage, as defined in claim 10, wherein said container includes internally projecting retaining or "hold-back" means in contact with the leading edges of the film assemblies of said film pack, exclusive of the foremost film assembly thereof.

12. A photographic assemblage, as defined in claim 3, wherein said yoke-like element includes two forwardly-extending end-members pivotally mounted on a pair of studs projecting from the side-wall members of said inner container section.

13. A photographic assemblage, as defined in claim 12, wherein said outer section of said container is flared rearwardly to provide at the sides thereof spacing for accommodating said end-members of said yoke-like element, said mounting studs therefor, and said actuating lever, and at the ends thereof spacing between the end-wall members of said inner section and the open ends of said outer section to contribute to the cooperative light-sealing function of said rear wall member of said outer section and said endwall members of said inner section.

14. A photographic assemblage, as defined in claim 13, wherein said spacing at one of said ends of said container is adapted to accommodate means of said camera for flexing the end-wall member of said inner section adjacent thereto to actuate said means for releasably holding said assemblage in locked position on said camera.

15. A photographic film container accommodating a plurality of film assemblies in the form of a film-pack for mounting on a camera wherein each of said film assemblies is moved forwardly to an exposure position and, thereafter, is moved laterally out of said container to adjacent processing means of the camera, said container comprising a generally rectangular outer section adapted to conform to the outside configuration of said camera and including, respectively, a rear-wall member, two opposed side-wall members, two substantially open opposed ends and a plurality of flange means extending forwardly from said rear wall in spaced relation so as to be disposed at least in part across said open ends, a substantially rectangular inner section of slightly smaller dimensions slidably mountable within an open face of said outer section and including, respectively, two opposed side-wall members, two opposed end-wall members interconnecting said side-wall members, said flange means of said outer section mating with said wall members of said inner section for positioning said section correctly and providing a light seal complementary holding means of said outer and inner sections for holding said inner section mounted in said outer section, forwardly and rearwardly movable film-assembly positioning means mounted within said sections for urging movement of said film-pack forwardly therewithin, means for actuating said positioning means, means for limiting the forward movement of said film-pack, aperture means permitting the lateral movement of each film assembly in succession from said container, means for holding said film-pack excepting a foremost film-assembly thereof against said lateral movement, and means for releasably holding said container in locked position on said camera.

16. A photographic film container, as defined in claim 15, wherein said film-assembly positioning means is a U-shaped element so pivotally mounted on bearing means positioned on a pair of wall members of said inner section as to bear against the rear surface of said film-pack when actuated and adapted to describe an arcuate movement within a pair of curved slots formed in said wall members.

References Cited

UNITED STATES PATENTS

| | | | |
|---|---|---|---|
| 1,936,654 | 11/1933 | Baxenden et al. | 95—22 |
| 2,073,640 | 3/1937 | Lauritz | 95—23 X |
| 3,002,437 | 10/1961 | Eloranta | 95—13 |

FOREIGN PATENTS 921,927  3/1963  Great Britain.

NORTON ANSHER, *Primary Examiner.*

G. H. HOFFMAN, *Assistant Examiner.*

UNITED STATES PATENT OFFICE
CERTIFICATE OF CORRECTION

Patent No. 3,386,361  
June 4, 1968

Bernard R. Danti

It is certified that error appears in the above identified patent and that said Letters Patent are hereby corrected as shown below:

Column 5, line 28, "iits" should read -- its --. Column 6, line 34, "shafe" should read -- shaft --; line 50, "constributes" should read -- contributes --. Column 8, line 16, "whereby" should read -- thereby --.

Signed and sealed this 16th day of December 1969.

(SEAL)  
Attest:

Edward M. Fletcher, Jr.  
Attesting Officer

WILLIAM E. SCHUYLER, JR.  
Commissioner of Patents